United States Patent
Truskovsky et al.

(10) Patent No.: US 8,639,236 B2
(45) Date of Patent: Jan. 28, 2014

(54) SYSTEM AND METHOD FOR CONTROLLING A FUNCTION OF AN ELECTRONIC DEVICE THROUGH A NETWORK

(75) Inventors: Alexander Truskovsky, Waterloo (CA); Shivangi Anantrupa Gandhi, Brampton (CA); Lei Zhang, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 113 days.

(21) Appl. No.: 13/208,750

(22) Filed: Aug. 12, 2011

(65) Prior Publication Data

US 2013/0040631 A1 Feb. 14, 2013

(51) Int. Cl.
 *H04M 3/00* (2006.01)
 *H04M 3/42* (2006.01)
(52) U.S. Cl.
 USPC .................. 455/420; 455/418; 455/414.2
(58) Field of Classification Search
 USPC .................. 455/414, 567, 410, 456, 507, 418
 See application file for complete search history.

(56) References Cited

U.S. PATENT DOCUMENTS

| | | | |
|---|---|---|---|
| 5,093,901 A * | 3/1992 | Cree et al. | 715/753 |
| 6,831,970 B1 | 12/2004 | Awada et al. | |
| 7,676,249 B2 * | 3/2010 | Willey | 455/567 |
| 2001/0049275 A1 | 12/2001 | Pierry et al. | |
| 2006/0099945 A1 * | 5/2006 | Helvick | 455/432.3 |
| 2008/0130957 A1 * | 6/2008 | Small | 382/115 |
| 2010/0076807 A1 * | 3/2010 | Bells et al. | 705/9 |

\* cited by examiner

*Primary Examiner* — Nizar Sivji
(74) *Attorney, Agent, or Firm* — McCarthy Tétrault LLP

(57) ABSTRACT

The disclosure provides a system, method and device for controlling function on an electronic device. The method comprises: receiving a communication from a communication network at the first device, the communication addressed to an account accessed by the first device and providing a first request for a meeting, a start time for the meeting and a second request to control a function of the first device for the meeting; identifying a component on the first device associated with the function; and deactivating the component when the start time arrives on the first device.

15 Claims, 10 Drawing Sheets

Fig. 4A

To: A, B, C
From: D
cc: E
bcc: F
Subject: Meeting
Time: 9AM to 10AM; Tues Jan. 10, 2012
Location: Room1

Header 402A

I would like to meet at Monday at 9:00 am, subject to everyone's availability.

As sensitive material is being discussed, device controls are being initiated

Body 404A

☐ Add function controls over invitees' devices

Option 406A

To: A, B, C
From: D
cc: E
Subject: Meeting
Time: 9AM to 10AM; Tues Jan. 10, 2012
Location: Room1

Header 702

I would like to meet at Monday at 9:00 am, subject to everyone's availability.

As sensitive material is being discussed, device controls are being initiated

Body 704

NOTE: For the meeting the following functions will be disabled:

Camera, Ringer, Phone   708

☐ I can attend   710

Notes 706

700

SYSTEM AND METHOD FOR CONTROLLING A FUNCTION OF AN ELECTRONIC DEVICE THROUGH A NETWORK

FIELD OF DISCLOSURE

The disclosure provided herein relates generally to a system and method for controlling a function of an electronic device through a network. In particular, the disclosure relates to controlling a feature of a portable communication device remotely through a network.

BACKGROUND

Portable electronic communication devices have powerful features in addition to voice and data communication capabilities, such as built-in cameras that can capture still images and video, audio recording capabilities, external network connections, such as Bluetooth and Wi-Fi connections and global positioning satellite (GPS) capabilities.

As such devices are effective recording and transmission devices, the presence of such devices in certain environments may lead to security concerns. For example, if such a device is with a user whom is participating in a meeting where confidential information is being discussed, there may be concerns that the user would use the device to make unauthorized recordings of the meeting through its camera or microphone.

There is a need for a system and method which addresses deficiencies in the prior art.

BRIEF DESCRIPTION OF THE DRAWINGS

Embodiments of the disclosure will now be described, by way of example only, with reference to the accompanying drawings, in which:

FIG. 4A is a block diagram of a GUI generated on a display associated with an electronic device of FIG. 1 in generating a meeting request in accordance with an embodiment;

FIG. 7 is a block diagram of another GUI generated on a display associated with the electronic device of FIG. 2 in receiving the meeting request of FIG. 4B in accordance with an embodiment;

DESCRIPTION OF EMBODIMENTS

Figure 1:
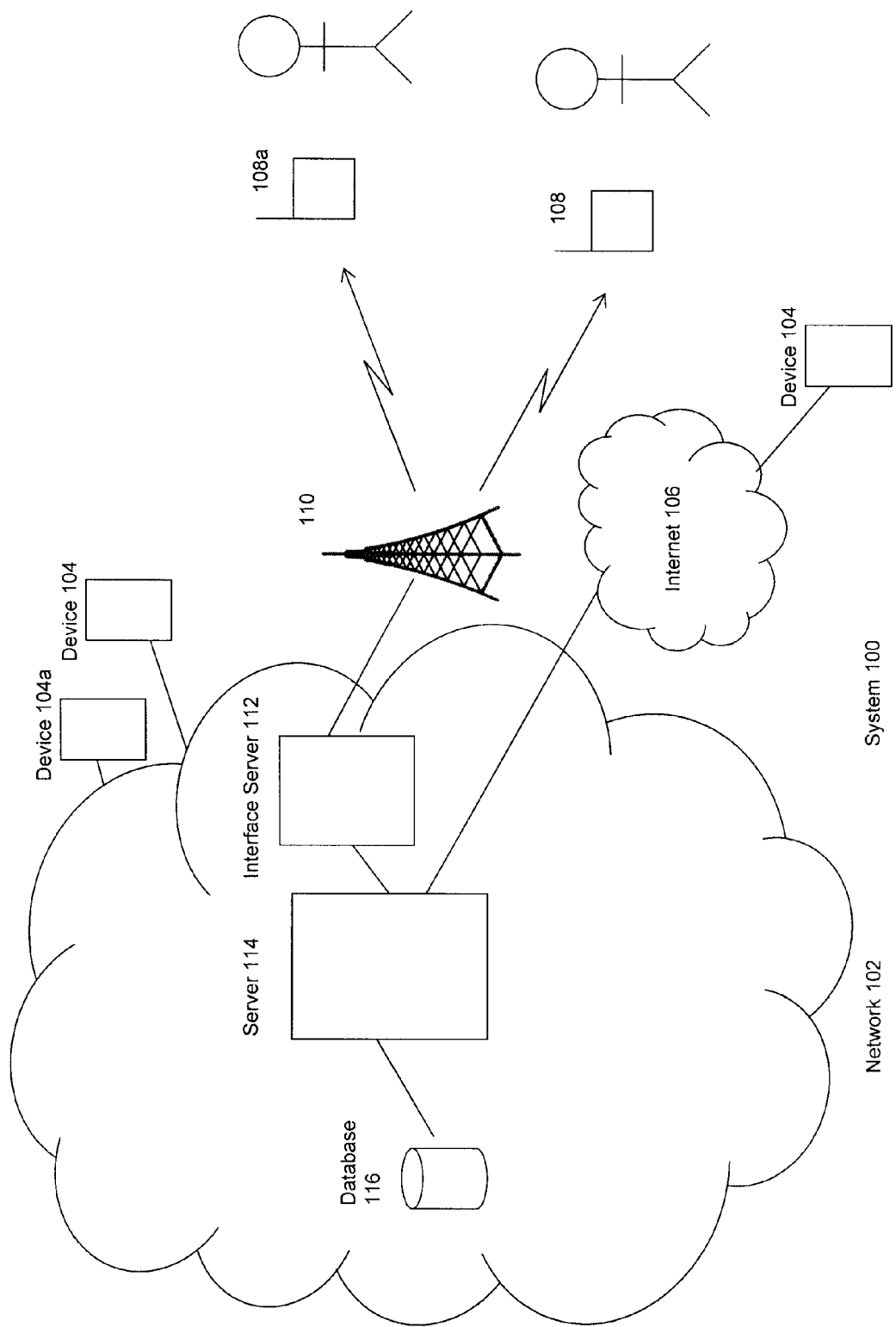
FIG. 1 is a schematic diagram of a communication network providing a server for a system that controls functions of electronic devices connected to the network.

The description which follows and the embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

Generally, an embodiment provides a system and method of controlling at least one function of an electronic device through a server in a network. An embodiment may provide meeting requests, akin to features provided in an Outlook (trade-mark) application. As part of a meeting request, an embodiment may also control functions for an electronic device that is associated with a user and his account receiving the request. As such, as part of a meeting scheduling application, an embodiment can set parameters for a meeting request and can provide one or more additional commands and/or control signals that controls operation of one or more functions on an electronic device. The control of the function may persist for the duration of the meeting (or times around the meeting) or may be changed upon certain condition(s).

In a first aspect, a method for controlling functions at a first device through received communications is provided. The method comprises: receiving a communication from a communication network at the first device, the communication addressed to an account accessed by the first device and providing a first request for a meeting, a start time for the meeting and a second request to control a function of the first device for the meeting; identifying a component on the first device associated with the function; and deactivating the component when the start time arrives on the first device.

The method may further comprise: providing a response to the communication network from the first device indicating whether the first request is accepted; and not deactivating the component when the start time arrives on the first device if the response indicates that the first request is not accepted.

In the method, the communication may include a notification that the function will be deactivated for the meeting on the first device.

The method may further comprise activating the component on the first device when the first device is moved from a location associated with the meeting, the location provided in the communication.

The method may further comprise activating the component when an end time for the meeting passes on the first device, the end time provided in the communication.

In the method, the component may be one of a camera or microphone.

In the method, deactivating the component may be controlled by an activation module operating on the first device.

The method may further comprise identifying a second component on a second device associated with the function and deactivating the second component on the second device when the start time arrives on the second device if the second device is associated with the account at the start time.

The method may further comprise activating the second component on the second device when an end time for the meeting passes on the second device, the end time provided in the communication.

The method may further comprise: providing a response to the communication network from the first or the second device indicating whether the first request is accepted; and not deactivating the second component when the start time arrives on the second device if the response indicates that the first request is not accepted.

In the method, the component may be identified by accessing a database correlating the function to the second component for the second device.

In a second aspect, a method for controlling functions for devices for a meeting is provided. The method comprises: determining a relationship between a recipient of a meeting request having a first account in a communication network and a requestor for the meeting having a second account in the network; generating a communication for transmission to the first account from the second account, the communication providing a first request for the meeting and a start time for the meeting; and if the relationship indicates that the second account has a control capability over the first account then the communication further includes a second request to deactivate a function at a device that is accessing the first account at the start time.

The method may further comprise: processing a response to the communication from the first account, the response indicating whether the first request is accepted for the first account; and deactivating the component when the start time arrives on the first device if the response indicates that the first request has been accepted by the first device.

In the method, a database of containing relationships of accounts including the first account and the second account may be accessed to determine the relationship between the first and second accounts.

In a third aspect, an electronic communication device is provided, comprising: a communication module to process communications from a communication network; and a calendar module to process a first request for a meeting received through the communication module, a start time for the meeting and a second request to control a function of the first device for the meeting, to identify a component on the electronic communication device associated with the function and to deactivate the component when the start time arrives on the electronic communication device.

In the device, the calendar module may further provide a response to the communication network to the first request indicating whether the first request is accepted; and may not deactivate the component when the start time arrives on the electronic communication device if the response indicates that the first request is not accepted.

In the device, the calendar module may further activate the component when the electronic communication device is moved from a location associated with the meeting, where the location provided in the communication.

In the device, the calendar module may further activate the component when an end time for the meeting passes on the electronic communication device, the end time provided in the communication.

In the device, the component may be one of a camera or microphone.

In other aspects, various combinations of sets and subsets of the above aspects are provided.

Exemplary details of embodiments are provided herein. First, a description is provided on an exemplary communication network that provides features of an embodiment. Next details are provided on a server and an electronic device that implement specific features of an embodiment. Finally, details are provided on exemplary processes and algorithms relating to an embodiment.

First, for details on an exemplary network for an embodiment, FIG. 1 shows communication system 100 where network 102 provides a suite of applications, services and data to its connected electronic communication devices 104 through its associated servers. Electronic communication devices 104 connect to network 102 through wired connections or through an external connection through Internet 106. Wireless devices 108 connect to network 102 through wireless network 110.

Architecture of network 102 can be implemented in any known topologies. Wireless network 110 includes antenna, base stations and supporting radio transmission equipment known to those skilled in the art. In network 102, interface server 112 provides the main interface between network 102 and wireless network 110 to devices 108. Security systems within network 102 can be provided by known techniques and systems.

Electronic communications are provided among devices 104 that are connected directly to network 102, devices 104 that are connected through Internet 106 and devices 108 that communicate through wireless network 110. One embodiment provides email communications based on a client-server architecture for an email system. Therein, attached local devices, such as devices 104 and even ultimately devices 108, are the clients to server 114. Server 114 manages email communications and calendar functions among its connected devices 104 and 108. For an IP-based network, server 114 has software provided thereon and is configured to monitor specific ports on which emails and calendar commands to and from its associated devices 104, 108 are sent and received. Further detail on server 114 is provided below.

Database 116 provides a data storage system for one or more elements in network 102, including server 114.

For communications directed to wireless devices 108, in some architectures, an interface for communications between server 114 and network 110 is provided. The interface (not shown) may be provided as a separate server or may be provided as part of either server 112 and/or server 114.

Figure 2:
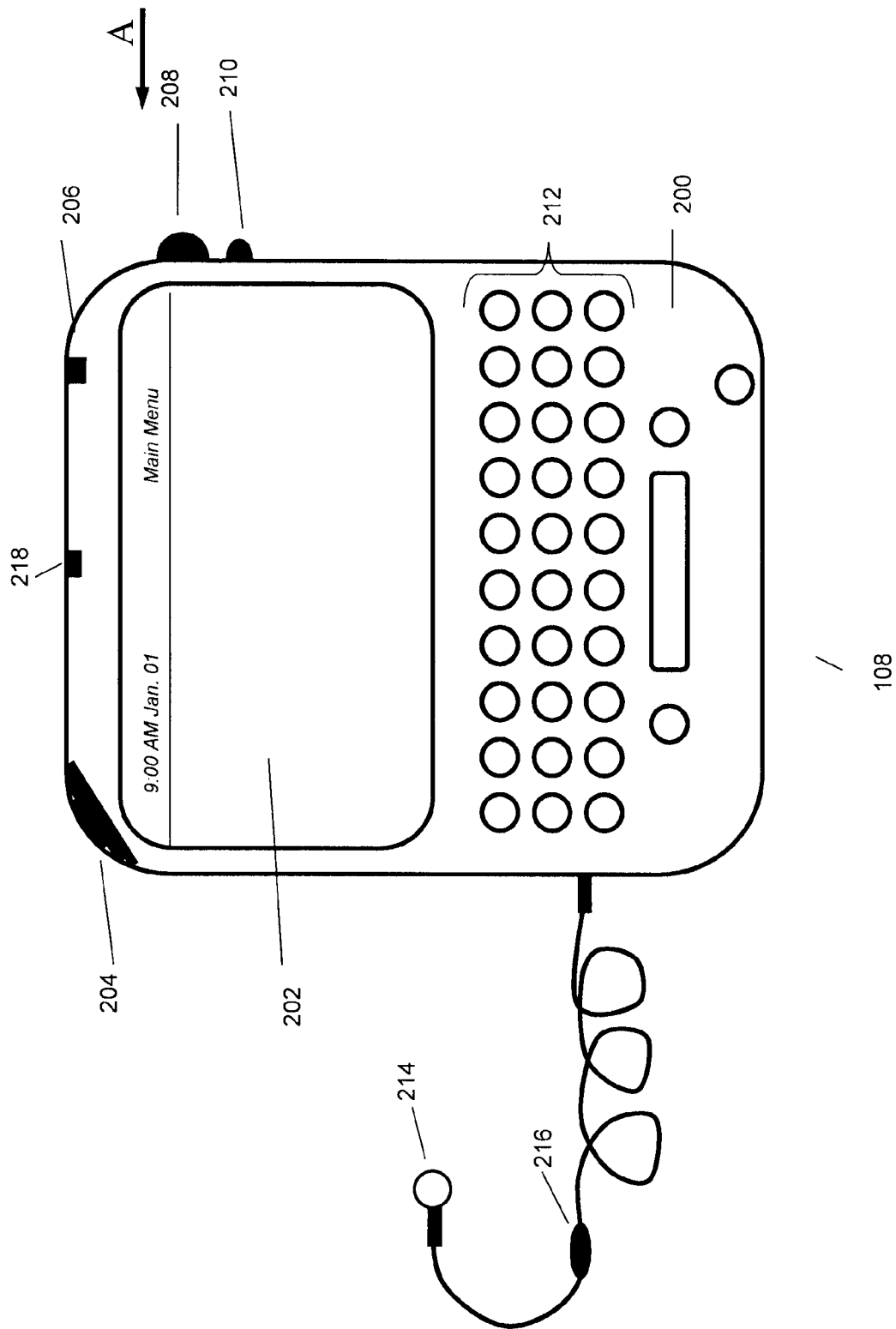
FIG. 2 is a block diagram of an electronic device of the devices of FIG. 1 having a function that is being controlled in accordance with an embodiment.

FIG. 2 illustrates general features of electronic device 108 in accordance with an embodiment. In the present embodiment, electronic device 108 is based on a computing platform having functionality of an enhanced personal digital assistant with cellphone, e-mail and calendar features. It is, however, to be understood that electronic device 108 can be based on construction design and functionality of other electronic devices, such as smart telephones, desktop computers, tablets, pagers or laptops having telephony equipment.

Electronic device 108 includes housing 200, display 202 (which may be a liquid crystal display—LCD), speaker 204, LED indicator 206, input device 208 (which may be a touchpad, trackpad, a trackball a key or another device), an ESC ("escape") key 210, keypad 212, a telephone headset comprised of ear bud 214, microphone 216 and camera 218. Display 202 may be a touch display. Input device 208 and ESC key 210 can be inwardly depressed along the path of arrow "A" as a means to provide additional input to electronic device 104. Any of these components can also be present in device 104.

It will be understood that housing 200 can be made from any suitable material as will occur to those of skill in the art and may be suitably formed to house and hold all components of electronic device 108.

Electronic device 108 is operable to conduct wireless telephone calls, using any known wireless phone system such as a Mobitex (trade-mark) network, a DataTAC (trade-mark) network, a General Packet Radio Service (GPRS) network and also a variety of voice communication networks, such as Advanced Mobile Phone Service (AMPS), Time Division Multiple Access (TDMA), Code Division Multiple Access (CDMA) system, wireless CDMA, CDMA 2000 system, Cellular Digital Packet Data (CDPD) system, Personal Communication Service (PCS), Global System for Mobile Communication (GSM), Wi-Fi networks, 3GPP Long Term Evolution (LTE) networks, etc. Other wireless phone systems that electronic device 104 can operate with can include Wireless WAN (IMS), Wireless MAN (Wi-Max or IEEE 802.16), Wireless LAN (IEEE 802.11), Wireless PAN (IEEE 802.15 and Bluetooth), high-speed data packet access (HSDPA) networks, etc. and any others that support voice. Other embodiments include Voice over IP (VoIP) type streaming data communications that can simulate circuit-switched phone calls. Its communication system provides device 104 with capabilities of communicating with other devices using various communication technologies, including instant messaging (IM) systems, text messaging (TM) systems and short message service (SMS) systems. Ear bud 214 can be used to listen to phone calls and other sound messages and microphone 216 can be used to speak into and input sound messages to electronic device 108. Electronic device 108 is a processor-controlled device (not shown).

Software modules operating on electronic device 108 control its operations and provide device 108 with additional functionalities. An email module (not shown) provides an interface and system to process and manage email accounts and messages through device 108. A calendar module (not shown) provides an interface and system to process and manage appointments and meeting requests generated at accounts accessed by device 108. The calendar module may be incorporated with the email module and/or the calendar module may have similar functions for processing appointments and meeting requests as to functions for processing emails provided by the email module. Further detail on selected modules is provided below.

It will be appreciated that wireless device 104 may have some or all of the functions, components and/or modules of device 108 described herein. For the sake of convenience, any description of features or functions of device 108 are applicable to device 104, unless otherwise noted.

Figure 3:
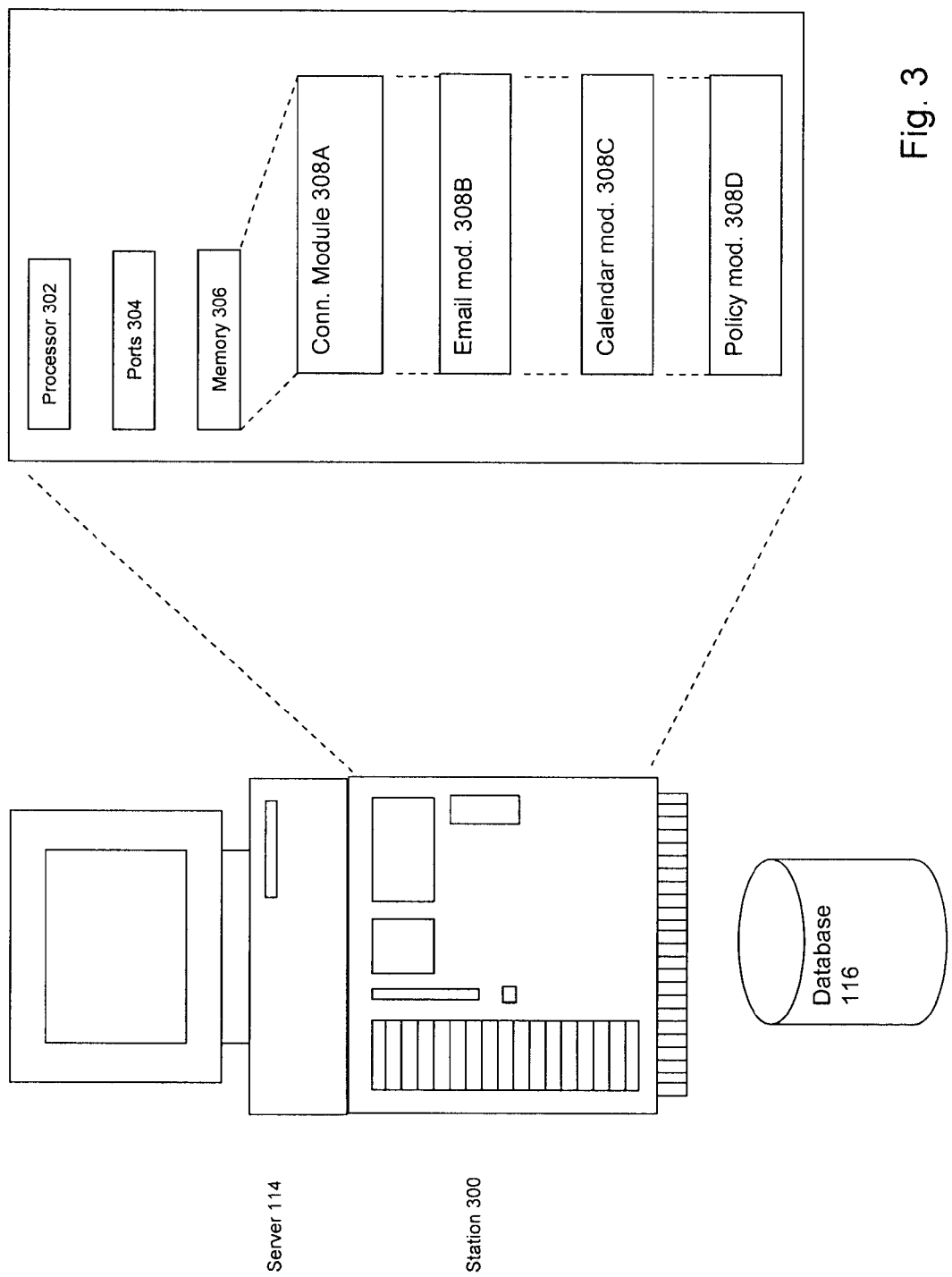
FIG. 3 is a block diagram of the server of FIG. 1 in accordance with an embodiment.

Next, referring to FIG. 3, further detail is provided on server 114, shown as station 300, which provides a mail transfer agent (MTA) that routes emails among its managed email accounts. Email accounts can be accessed by devices 104 and 108 connected to network 102. In one embodiment, server also provides calendar functions for accounts accessed by devices 104 and 108, although such features can be provided in a separate server. Server 114 supports client access, such as access from connected devices 104 and 108 using Post Office Protocol (POP), Internet message Access Protocol (IMAP), Single Mail transfer Protocol (SMTP) or other protocols.

Server 114 is based on a general purpose computing platform. It may have the form factor of a desktop, laptop computer or minicomputer. It may be a virtual server comprising modules that are installed on one or more devices, including on electronic device 104. Server 114 has processor 302 having communication connections software and data storage. In particular, processor 302 is provided to control and receive almost all data, transmissions, inputs and outputs related to server 114. Processor 302 preferably controls the overall operation of server 114 and its components. Exemplary processors for processor 302 include microprocessors in the Data 950 (trade-mark) series, the 6200 series and the PXA900 series, all available at one time from Intel Corporation. Processor 302 is connected to other elements in server 114 through a series of electrical connections to its various input and output pins. Processor 302 has an IRQ input line which allows it to receive signals from various devices and modules.

Appropriate interrupt firmware is provided which receives and reacts to the signals detected on the IRQ line. An interrupt signal may be used to indicate a request to terminate the segmented scanning mode of an embodiment.

Ports 304 provide connections to network 102. Memory 306 is used to store local mail for local users and provides a temporary site for storage of messages as they are put in the process of being transmitted. Server 114 also has access to database 116.

Software modules 308 stored in memory 306 provide programs that are executed on processor 302 that provide functionality for server 114. Exemplary modules are described herein.

Communication module 308A provides low level operations that allow for monitoring, processing and transferring of messages, signals and emails among server 114 and its clients (e.g., devices 104 and 108).

Email module 308B provides an interface and system to process and manage email accounts and messages generated at accounts accessed by devices 104 and 108.

Calendar module 308C provides an interface and system to process and manage appointments and meeting requests generated at accounts accessed by devices 104 and 108. Calendar module may be incorporated with email module 408B and/or may have functions for processing appointments and meeting requests that are similar to functions for processing emails provided by module 308B.

It will be appreciated that functions and features of server 114 may be provided in other systems in network 102. For example, comparable functions may be provided in enterprise server 122 for email and/or calendar functions handled between wireless devices 108 and devices 104 connected to server 114. In other embodiments, a peer-to-peer messaging system may be provided.

With features of device 104 and server 114 described, further detail is provided on features of an embodiment.

One feature of an embodiment is to provide control over functions of an electronic device through another electronic device. The functions can control one or more input/output devices of the electronic device. In one configuration, an electronic request can be generated and sent from an originating electronic device (such as device 104A, FIG. 1) to one or more target electronic devices (such as device 108A, FIG. 1) to control one or more functions of the target electronic device. The request can be provided as a meeting request that is managed by a calendar module and/or an email module operating on the device(s) and/or by modules operating on a server. The request can be sent and received by the same device as well. Also, the request can be sent from a central location, such as from a server.

Figure 4B:
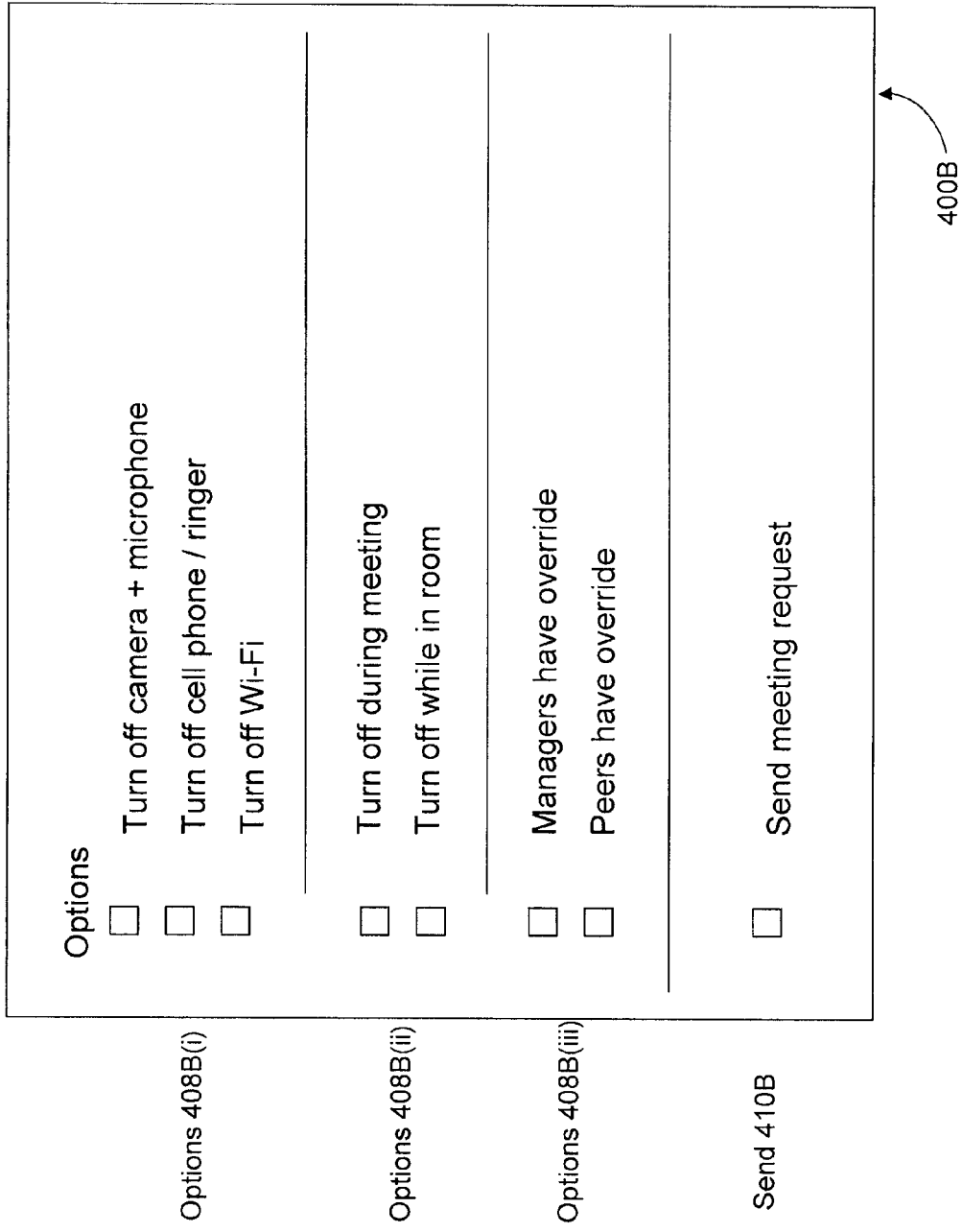
FIG. 4B is a block diagram of another GUI generated on a display associated with an electronic device of FIG. 1 in selecting a function to be controlled for the meeting request of FIG. 4B in accordance with an embodiment.

FIGS. 4A and 4B show GUIs of an exemplary meeting request form 400A and 400B generated at an originating device, such as device 104A of FIG. 1. The form is generated by a calendar module acting as a client operating on device 104A. Overall processing and distribution of meeting requests is provided through a module on a server, such as a calendar module operating on server 114 of FIG. 1.

Message form 400A has a header field 402A for the recipients of the request (as in "to", "cc" and "bcc" fields) and body 404A for text associated with the request. Generally, the requesting party and the recipients are identified by accounts managed by server 114 (or another server). A user can access his/her account through any device 104, 108 when the appropriate client calendar module is installed on that device and the user provides the proper credentials (e.g. user name and password) to access the account.

Form 400B, which can be generated if an option to generate same is triggered (for example through radio button option 406A in form 400A, FIG. 4A), provides options for controlling functions of devices that are used when the recipients of the meeting request attend at the scheduled meeting. The options may be grouped together in various configurations. Form 400B shows: one set of options for functions to be controlled per options 408B(i); another set of options for deactivation conditions for the functions per options 408B(ii); and another set of options showing override conditions per options 408B(iii).

Options 408B(i) may include controls for one or more functions of the devices of the recipients of the meeting request (e.g. turn off one or more of the camera, cellphone, Wi-Fi connections, microphone, ringer, display, enable/disable print functions, write functions to internal/external storage devices or other input/output devices, turn off or limit other network communications on the devices, etc).

Options 408B(ii) may include parameters specifying when and where the controls are implemented (e.g. only during the time when the meeting is scheduled, only if the device is determined to be in the meeting room, only when the recipient is in the meeting, turn off the ringer and display in a movie theatre, etc.). For example, it may be permissible to have the camera activated after a certain time, but the ringer is to be turned off during the entire meeting. These parameters may be linked to individual and/or groups of functions.

Options 408B(iii) may include parameters which recipients can override the control functions (e.g. managers, recipients of the meeting request whom are superiors to the meeting requestor; peers of the requestor, etc.), which recipients are by default provided the control functions (e.g. subordinates of the requestor, peers of the requestor, specific account holders, etc.). Analysis of which users are superiors to a user in an organizational hierarchy chart, peers to the user at a same level and peers to the user at a lower level can be performed when user accounts have hierarchical information embedded. Such information can be provided in a directory that stores user account information. One protocol for an exemplary directory is Lightweight Directory Access Protocol (LDAP). LDAP is one example of a structure that provides an account management hierarchy that can be used to determine what users should be required to have functions controlled. Such information can be stored in database 116.

Other options can be provided. A message may be included advising that function controls are being initiated. It will be appreciated that different recipients can have different functions controlled and that different functions can be controlled with different activation/deactivation conditions.

In other embodiments, when a message is being generated, the GUI may not provide any prompts for any control options for the recipients. However, a default setting may provide that certain recipients are automatically provided with function control notifications and/or function controls for the message. The selection of which recipients receive such notifications/controls can be preset based on parameters and organizational chart hierarchies noted herein.

An embodiment may provide profiles to group together functions that are to be activated and deactivated together in certain contexts. For example, a "meeting" profile may dictate that ringer functions are to be deactivated; a "sensitive meeting" profile may dictate that cell phone, Wi-Fi, camera and microphone functions are to be deactivated; a "movie" profile may dictate that ringer and display functions are to be deactivated. Such profiles may be listed in the options. Other profiles may be provided based on time, location and/or other meeting parameters.

Once the options and meeting parameters are set, the meeting request can be sent by activating send command 410B.

Figure 5:
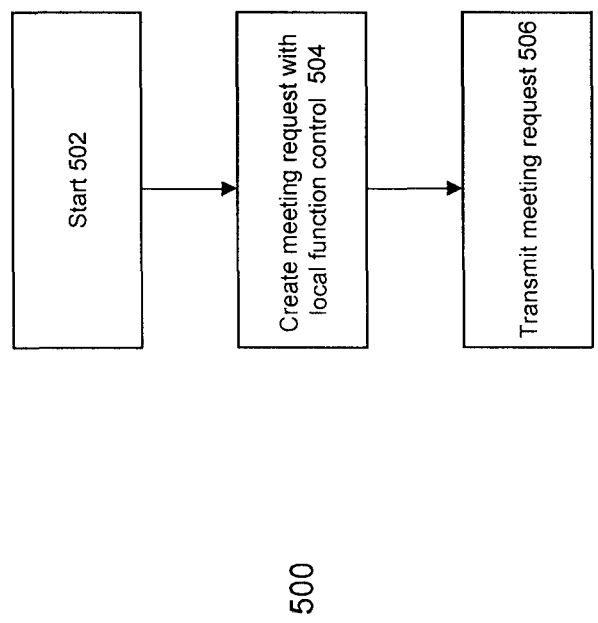
FIG. 5 is a flow chart of a process that creates a meeting request that includes control a function for an electronic device in FIG. 1 in accordance with an embodiment.

FIG. 5 shows flow chart 500 showing operational features of the calendar module of device 104A in initiating/processing a new meeting request. The process is started at start process 502, which may be activated by the user selecting a "new meeting" request option in a GUI generated by the calendar module. Next, at process 504, a meeting request form is populated with function controls. Finally, at process 506, the meeting request form has been completed and data relating to same is sent to server 114.

Once the send command is activated, the meeting request is sent to the calendar module of server 114 for processing, storage and distribution to devices 104 and 108 according to which recipients have signed onto their accounts and have activated the calendar module at their local devices.

Figure 6:
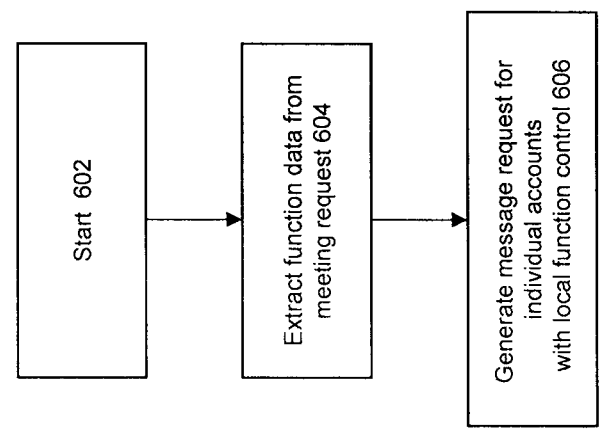
FIG. 6 is a flow chart of a module operating on the server device of FIG. 3 that processes a meeting request received by the electronic device of FIG. 5 in accordance with an embodiment.

FIG. 6 shows flow chart 600 showing operational features of the calendar module of server 114 in processing the new meeting request received from device 104A. The process is started at start process 602, which may be activated upon the receipt of the new meeting request data from device 104A. Next, at process 604, meeting information from the meeting request is extracted, including the time, date and location parameters recipient account information and details for any function controls and activation and deactivation parameters for the functions. Finally, at process 606, for each recipient account, a meeting request message is built that contains the meeting information and selected function control information; that meeting request message is sent to each account from server 114. Each recipient may be provided with a customized version of the request message.

Now further detail is provided on processes that are executed at a device that receives a meeting request.

FIG. 7 shows a GUI of an exemplary acceptance form 700 for a meeting request. Acceptance form 700 is generated a recipient's device, such as device 108A of FIG. 2. The form is generated by a calendar module acting as a client operating on device 108A.

Acceptance form 700 has a header field 702, taking details from the recipients of the request (per form 400A in its "to" and "cc" fields, but not the "bcc" field) and body 704 for text associated with the request (per form 400A and its body 404A). Notes field 706 shows details of any functions of device 108A that are being controlled during the meeting (as set in options 408B(i)-(iii)). In this example, field box 708 shows that the camera, ringer and phone of device 108A will be disabled during the meeting. In other embodiments, the details are not shown on the recipient's device. There is also radio button 710 which is activated if the user of device 108A wishes to accept the meeting request invitation.

If the user at device 108A "accepts" the meeting request, then a message is sent to server 114 noting same. As the meeting request contains meeting information (e.g. time, date and location parameters) and details on the function(s) of device 108A that are to be controlled, this information may then be used by server 114 or by an activation module on device 108A to send signals to components in device 108A to selectively activate and/or deactivate one or more components in device 108A that provide the function being controlled in the meeting request. As part of the controls, the activation module may provide a check to determine whether device 108A is actually at the meeting and/or is activated at the meeting time. As such, through the meeting request, when appropriate trigger conditions are satisfied, one or more functions on device 108A are deactivated and reactivated.

If the user at 108A "declines" the meeting request, then a message is sent to server 114 noting same. In one embodiment, if a decline is sent, no remote control of local functions on device 108A is provided. However, in other embodiments, such controls may be implemented in any event and can follow activation/deactivation parameters for functions on the device as noted as if the user had accepted the meeting request.

Figure 8:
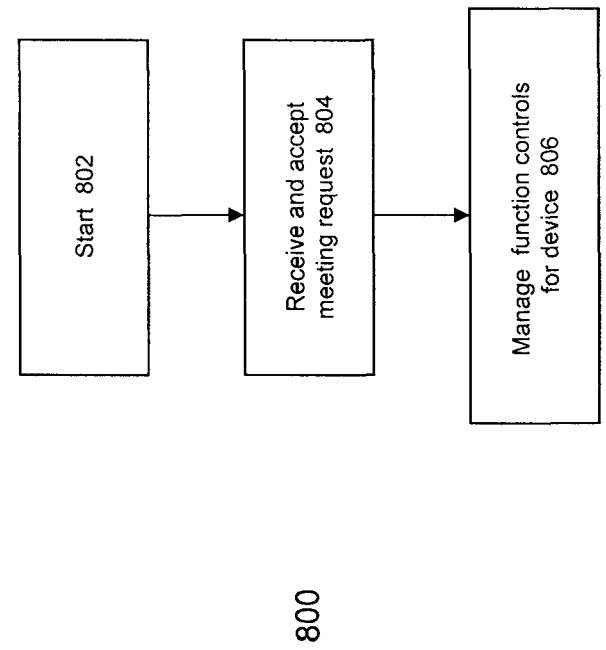
FIG. 8 is a flow chart of a module operating on the electronic device of FIG. 7 that processes a meeting request received by the server of FIG. 6 in accordance with an embodiment.

FIG. 8 shows flow chart 800 showing operational features of the calendar module of device 108A in processing a received new meeting request from server 114. The process is started at start process 802, which may be activated upon receipt of the new meeting request data from server 114 (or in other cases from device 104A), where an account associated with device 108A has been noted as an recipient/invitee for the meeting request. Next, at process 804, data from the meeting request is extracted, including details for any function controls and activation and deactivation parameters for the functions. Finally, at process 806, for function being controlled, device 108A identifies the related component that provides the function and initiates a program to selectively activate and deactivate that component based on the activation and deactivation parameters indentified in the request. Server 114 may send a generic meeting request with function control(s) to one or more devices 108. The request may not provide complete information on how the function controls is to be implemented on a specific device 108 that receives the request. This is because different device types may be provided with the meeting request. As such a mapping of the function may need to be provided to link the function (e.g. turn off speaker) the corresponding component that relates to the function on device 108A (e.g. deactivate speaker 204 and/or ear bud 214). There may be a database that maps functions with their associated components that is accessible by device 108A and/or server 114.

The above examples of an embodiment have used a scenario where device 104A is used to send a meeting request to device 108A. In other embodiments, a meeting request may be generated on device 108A and sent to device 104A.

Note in one embodiment, control of functions for the meeting request is device-centric, where that specific device from which the acceptance has been sent will have its functions controlled per the meeting request. Such controls may be implemented only if the account associated with the acceptance is still active on the device when the meeting starts. Alternatively, such controls may be implemented on the device regardless of whether the account associated with the acceptance is still active on the device when the meeting starts.

In another embodiment, control of functions for the meeting request is account-centric, where when a user has provided acceptance of the meeting for that account (from any device), then when the meeting starts, one or more devices that are associated (e.g. have logged into) that account will have their functions controlled per the meeting request.

Further detail is now provided on deactivation and reactivation parameters and conditions for controlling a function on a device.

Deactivation condition(s) may be based on time, location and/or action parameters, including one or more of the starting of the meeting, the presence of device 108A at the meeting location, the presence of the meeting recipient at the meeting and others. If the deactivation condition(s) are already satisfied, then the function(s) can be immediately deactivated or alternatively the deactivation condition can be ignored. If the deactivation command is ignored (or not implemented), then a message may be sent to server 114 noting same. Reactivation trigger conditions can also be based on time, location and/or action parameters, including one or more of the ending of the meeting, the removal of device 108A from the meeting location, the removal of the meeting recipient at the meeting and others. Deactivation and reactivation can be device-centric or account-centric, as noted above.

Monitoring for both deactivation and reactivation conditions can be conducted locally at device 108A and/or through signals from other devices in network 102, such as server 114 and/or device 104A (as the originator of the meeting request). In one embodiment, the system provides generic instructions to affected device to activate/deactivate function (e.g. display etc.). The device itself would then be responsible for implementing control signals to locally control the component(s) that provide that function. With this arrangement centralized data of all functions of all devices in a network is not needed. However, if information on components of devices is available and centrally stored, it can be used to provide direct remote control of functions on those devices. In device 108A, these functions may be provided by an internal module, such as a calendar module and/or an activation module.

During the deactivation period for a function, there may be an event that may cause the function to be reactivated prior to its scheduled time/event. For example, during a meeting, if the user leaves the meeting before the end of the meeting time, then that event may be detected and any deactivated functions (e.g. cell phone, camera) may be reactivated. Detection of the user leaving the meeting may be triggered by a GPS signal showing that the device is no longer in the location of the meeting room). The user may also manually send a signal through the device indicating that he has left the meeting.

It is noted that a user may have access to several devices 104 and 108 and may have or may not have one or more of the devices at the scheduled meeting. An embodiment provides for control over devices that are recognized as being accessed by the user. For example, consider a user that is simultaneously accessing his account and his calendar module on a first set of devices (e.g. a computer at work, a smart phone and a laptop), but not on other devices (e.g. a computer at home). The local calendar module that is active on the first set of devices may control activation/deactivation its device's functions during the meeting, whether or not those devices are present with the user at the meeting (subject to any location triggering conditions noted above). Alternatively, server 114 may detect that the local calendar module that is active on the first set of devices and server 114 may control those functions of those devices during the meeting.

Remote control of a function of a device has been described using a calendar module. However, in other embodiments, other interfaces can be provided, for example a messaging system, such as an email, to send remote control notifications from one device to another device.

With functions and operations of features of an embodiment provided, further detail is provided on components in device 108A. It will be appreciated that comparable features may be provided for device 104.

Figure 9:
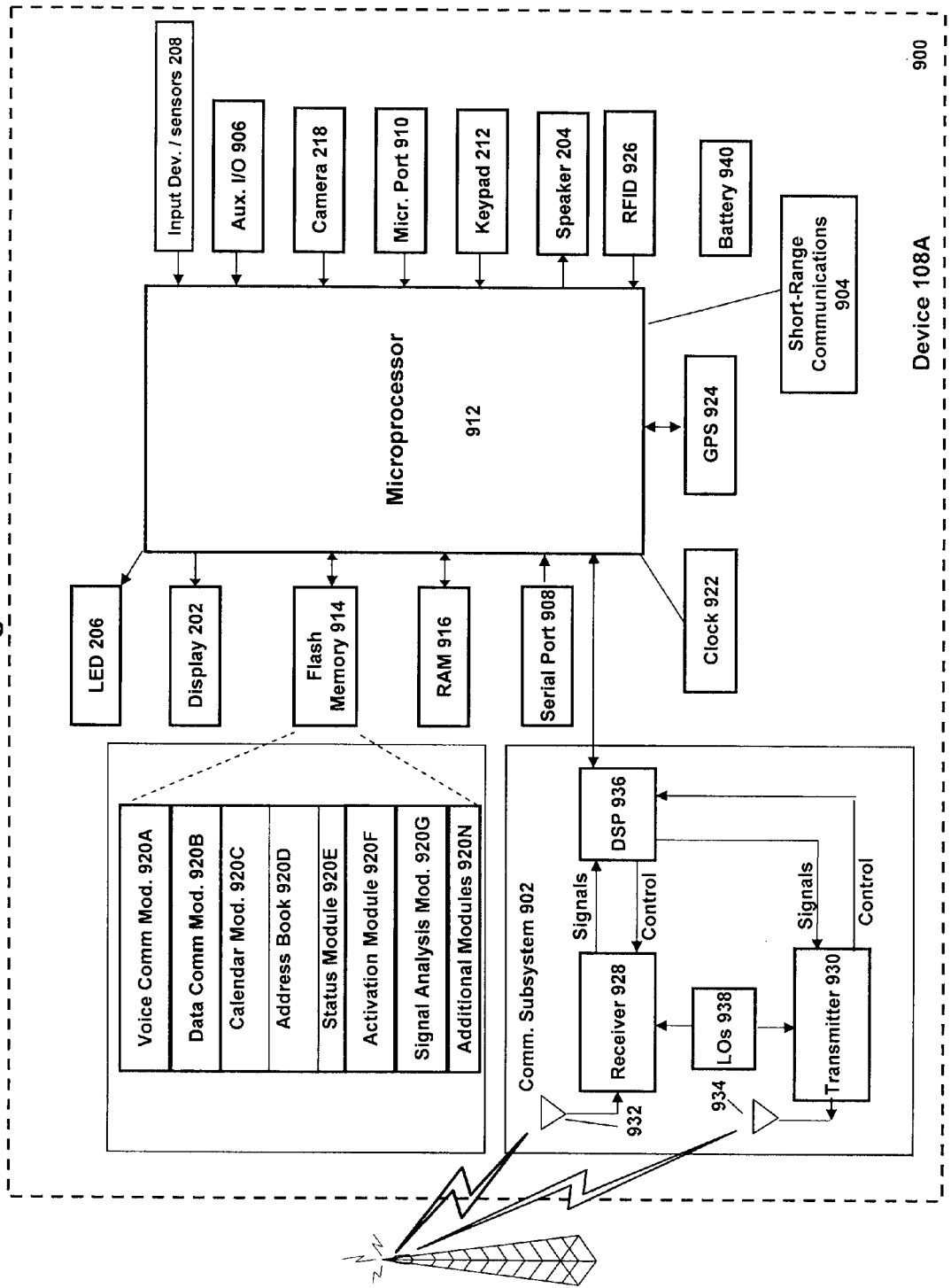
FIG. 9 is a block diagram of certain internal components of the electronic device in FIG. 2.

Referring to FIG. 9, device 108A, has communication sub-systems, which control communication functions, including data and voice communications. These functions are controlled and operated through communication sub-system 902 and short-range communication sub-system 904. Collectively, sub-systems 902 and 904 provide the signal-level interface for all communication technologies processed by device 108A. Auxiliary input/output (I/O) ports 906 and serial port 908 are provided to allow device 108A to be connected to and communicate with additional external devices. Microphone port 910 provides a port for microphone 216. Processor 912 is provided to execute instructions provided in its stored program modules and provides similar functionality for device 108A as processor 302 provides for server 114. Non-volatile memory in the form of flash memory 914 is provided. RAM 916 is also provided. Either memory can be used to store portions of expected acoustic patterns and other data relating to pattern analysis.

Various modules 920 stored in memory 914 provide the operational controls to further process and log the communications that are executed on processor 912 that provide functionality for device 108A. Exemplary modules are described herein.

Voice communication module 920A and data communication module 920B control operations of voice and data communications with sub-systems 902 and 904 for device 108A. Calendar module 920C provides a scheduling application to track calendar appointments on device 108A. Address book module 920D provides an address storage application to track contact data on device 108A. Status module 920E provides status information on various internal and external systems and components for device 108A.

Features to control activation of functions as described herein (per for example FIG. 8) may controlled through calendar module 920C and/or activation module 920F. Briefly, activation module 920F stores the activation and deactivation cycle data provided from a meeting request (described earlier) as processed by calendar module 920C and monitors components of device 108A for trigger conditions that can signify that a component should be activated or deactivated, following the parameters of the meeting request data. Signal analysis module 920G conditions data provide from input devices, sensors and other components of device 108A for processing by other modules. For example, time and GPS data may be analyzed. Also, signal analysis module 920G may filter data to before providing the data to activation module 920F for analysis. In a peer-to-peer based embodiment, calendar module 920C and activation module 920F may exchange data, messages and control signals with another device 108/104. In a client-server based embodiment, calendar module 920C and activation module 920F may exchange data, messages and control signals with server 114.

Other modules 920 are also provided.

Clock 922 provides a synchronization clock for device 108A. Global positioning system (GPS) module 924 provides location data for device 108A. Radio frequency identification (RFID) module 926 provides an interface to manage RFID tags and data. Sensors 208 may detect various external ambient conditions (e.g. temperature, humidity, pressure, etc.).

Communication sub-system 902 includes receiver 928, transmitter 930 and one or more antennas, illustrated as receive antenna 932 and transmit antenna 934. In addition, communication sub-system 902 also includes processing modules, such as digital signal processor (DSP) 936 and local oscillators (LOs) 938. Specific features of communication sub-system 902 are dependent upon the communication network in which device 108A operates, where such networks were described earlier.

Short-range communication sub-system 904 enables communication between device 108A and other proximate systems or devices, which need not necessarily be similar devices. For example, the short-range communication sub-system may include an infrared device and associated circuits and components, or a Bluetooth (trade-mark) communication module to provide for communication with similarly enabled systems and devices.

Powering components of device 108A is power source 940. In one embodiment, power source 636 includes one or more batteries. In another embodiment, power source 636 is a single battery pack, especially a rechargeable battery pack. A power switch (not shown) may be provided as an "on/off" switch for device 108A. A power source interface (not shown) may be provided in hardware, firmware, software or a combination of such elements to selectively control access of components in device 108A to power source 940. Some other devices 108 may not have all components described in FIG. 9.

It will be appreciated that the embodiments relating to methods, devices, processes, application, modules and systems may be implemented in a combination of electronic hardware, firmware and software. The firmware and software may be implemented as a series of modules, applications and/or processes that provide the functionalities described herein. Algorithms, processes and methods described herein may be executed in different order(s). Interrupt routines may be used. Data may be stored in volatile and non-volatile devices described herein and may be updated by the hardware, firmware and/or software.

It will be appreciated that variations on processes described herein can be provided where the processes are provided in different orders, some of the processes are omitted or additional processes are provided to further process the notifications. It will further be appreciated that notifications provided between devices (e.g. device 104A to server 114 and server 114 to device 108A) may be provided in one or more of several signalling techniques, including using messages, semaphores, setting values in predetermined shared memory locations as flags for various states, etc., using techniques known to those in the art.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method for controlling functions at a first device, the method comprising:
   receiving a communication at the first device from a communication network, the communication providing
      a first request for a meeting tracked by a calendar application operating on the first device,
      a start time for the meeting,
      a location associated with the meeting; and
      a second request to control a function of the first device for the meeting when a first account associated with a recipient of the first request is controllable by a second account that initiated the first request; and
   being addressed to an account being accessed by the first device;

identifying a component on the first device associated with the function;
providing a response to the communication network from the first device indicating whether the first request is accepted;
deactivating the component when the start time arrives on the first device if the response indicates that the first request is accepted; and after the component is deactivated, reactivating the component when the first device is moved from the location; and
not deactivating the component when the start time arrives on the first device if the response indicates that the first request is not accepted.

2. The method for controlling functions at a first device as claimed in claim 1, wherein:
the communication includes a notification that the function will be deactivated for the meeting on the first device.

3. The method for controlling functions at a first device as claimed in claim 1, further comprising:
activating the component when an end time for the meeting passes on the first device, the end time provided in the communication.

4. The method for controlling functions at a first device as claimed in claim 1, wherein:
the component is one of a camera or microphone.

5. The method for controlling functions at a first device as claimed in claim 1, wherein:
deactivating the component is controlled by an activation module operating on the first device.

6. The method for controlling functions at a first device as claimed in claim 1, further comprising:
identifying a second component on a second device associated with the function and deactivating the second component on the second device when the start time arrives on the second device if the second device is associated with the account at the start time.

7. The method for controlling functions at a first device as claimed in claim 6, further comprising:
activating the second component when an end time for the meeting passes on the second device, the end time provided in the communication.

8. The method for controlling functions at a first device as claimed in claim 6, further comprising:
providing a response to the communication network from the first or the second device indicating whether the first request is accepted; and
not deactivating the second component when the start time arrives on the second device if the response indicates that the first request is not accepted.

9. The method for controlling functions at a first device as claimed in claim 8, wherein:
the component is identified by accessing a database correlating the function to the second component for the second device.

10. A method for controlling functions for devices for a meeting managed by a calendar application operating on a first device, the method comprising:
determining a relationship between a recipient of a meeting request having a first account in a communication network and a requestor for the meeting having a second account in the network;
generating a communication for transmission to the first account from the second account, the communication providing a first request for the meeting tracked by the calendar application, a start time for the meeting, a location for the meeting and a second request to control a function of the first device for the meeting;

if the relationship indicates that the second account has a control capability over the first account then the communication further includes
a second request to deactivate a function at the first device that is accessing the first account at the start time at the location; and
a third request after the function has been deactivated to reactivate the function when the first device is moved from the location; and
if the relationship indicates that the second account does not have the control capability over the first account then not including the second request to deactivate a function in the communication.

11. The method for controlling functions for devices for a meeting as claimed in claim 10, further comprising:
processing a response to the communication from the first account, the response indicating whether the first request is accepted for the first account; and
deactivating the component when the start time arrives on the first device if the response indicates that the first request has been accepted by the first device.

12. The method for controlling functions for devices for a meeting as claimed in claim 10, wherein:
a database of containing relationships of accounts including the first account and the second account is accessed to determine the relationship.

13. An electronic communication device comprising:
a communication module to process communications from a communication network; and
a calendar module
to process a communication from the communication network, the communication containing a first request for a meeting received through the communication module, a start time for the meeting, a location for the meeting and a second request to control a function of the electronic communication device for the meeting,
to identify a component on the electronic communication device associated with the function and to deactivate the component when the start time arrives on the electronic communication device;
to provide a response to the communication network indicating whether the first request is accepted;
to deactivate the component when the start time arrives on the electronic communication device if
the response indicates that the first request is accepted;
a first account associated with a recipient of the first request is controllable by a second account that initiated the first request; and
the electronic communication device is at the location;
after the component has been deactivated, to reactivate the component when the electronic communication device is moved from the location; and
to not deactivate the component when the start time arrives on the electronic communication device if the response indicates that the first request is not accepted.

14. The electronic communication device as claimed in claim 13, wherein the calendar module further:
activates the component when an end time for the meeting passes on the electronic communication device, the end time provided in the communication.

15. The electronic communication device as claimed in claim 13, wherein:

the component is one of a camera or microphone.

\* \* \* \* \*